C. ENGLERT.
LAMP BRACKET.
APPLICATION FILED MAR. 8, 1916.
1,206,826.
Patented Dec. 5, 1916.
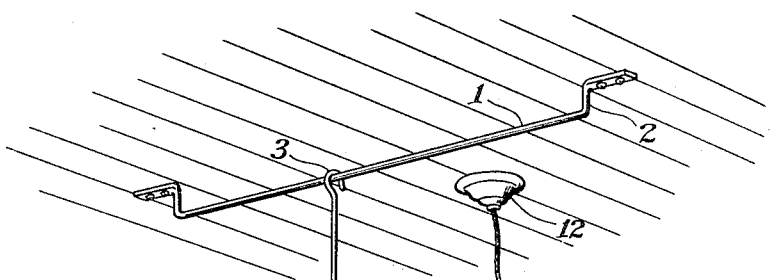
Fig.1.
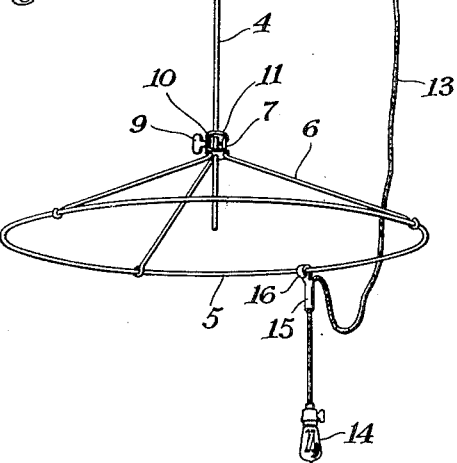
Fig.2.
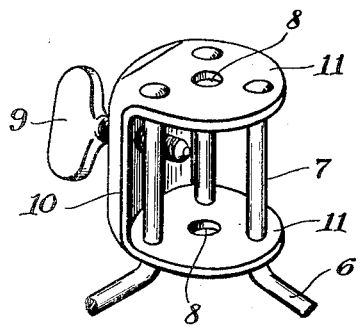
Fig.3.
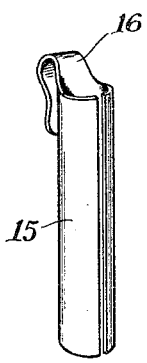
Inventor:
Charles Englert
by Davis & Simms
Attorneys

UNITED STATES PATENT OFFICE.

CHARLES ENGLERT, OF ROCHESTER, NEW YORK.

LAMP-BRACKET.

1,206,826.   Specification of Letters Patent.   Patented Dec. 5, 1916.

Application filed March 8, 1916. Serial No. 82,845.

*To all whom it may concern:*

Be it known that I, CHARLES ENGLERT, a citizen of the United States, and resident of Rochester, in the county of Monroe and State of New York, have invented certain new and useful Improvements in Lamp-Brackets, of which the following is a specification.

The present invention relates to a light holder for holding electric lights in such a manner that said lights may be shifted to various positions in order to cover a large area, an object of this invention being to provide a construction in which the light is adapted to be connected at various points so that the shifting of the light may be effected with the minimum amount of work on the part of the user of the light.

Another object of the invention is to provide a construction which will have a minimum number of parts for effecting the widest range of adjustment of the light and will at the same time be inexpensive to manufacture and not liable to get out of order.

To these and other ends, the invention consists of certain parts and combinations of parts all of which will be hereinafter described, the novel features being pointed out in the appended claims.

In the drawings:—Figure 1 is a perspective view of a light holder constructed in accordance with the present invention; Fig. 2 is a detail perspective view of the ring head showing the manner in which the head connects with the suspension rod and ring supporting arms; and Fig. 3 is a detail perspective view of the cable clamp.

Referring more particularly to the drawings, 1 indicates a way or a guide having laterally-extending supporting or attaching members 2 to be secured to the ceiling or other support in the room in which the holder is arranged, in order to space the guide rod or way 1 from the wall. Coöperating with the guide rod 1 is a hook 3 at the upper end of a suspension rod 4, said hook being detachable from the horizontal rod, and also movable longitudinally of said rod in order to shift the position of the lamp supporting frame.

Supported by the suspension rod 4 is a ring 5, the plane of which is preferably at right angles to the length of the suspension rod. This ring is supported from the rod by inwardly and upwardly converging supporting arms 6, the ends of which are turned laterally or upwardly at 7 in parallel relation, in order to connect with a head which is secured to the suspension rod 4.

The securing-head is preferably in the form of a U-shaped member formed from a single piece of sheet metal and having its two arms 11 provided with central and alined openings 8 through which the rod 4 extends to adjustably connect the ring to the suspension rod. A clamping member 9 in the form of a screw passes through the connecting portion 10 of the head to engage said rod between the two arms 11, so that a very effective binding action is provided due to the fact that the rod is engaged at two points on one side, and at an intermediate point on the opposite side.

The horizontal guide-rod 1 is preferably supported to one side of the box 12 from which the cable or cord 13 of the light 4 extends, and the cord or cable has a clamp adjustably secured thereto in the form of a split soft metal sleeve 15 provided at its upper end with a hook 16 adapted to engage the ring 5 at any point on the periphery of the latter.

The use of the invention will be apparent but it may be summarized as follows: The sleeve 15 is secured to the cord or cable 13 at any desired point on the latter and is then hooked over the ring 5 at such a point as to properly position the light 14. If the light is not exactly in the proper location, the suspension rod 4 may be shifted on the guide 1, thus giving the light a greater field of adjustment.

At the present time, large factories experience a great deal of difficulty in properly positioning electric lights with reference to the work of the operatives. Cords or strings are strung from numerous points and attached to the conducting table or cord of a lamp in order to locate a lamp in a desired position. If the lamp is to be taken down, these cords must be cut and again adjusted, all of which consumes time and adds to the cost of manufacture of the article on which the operative is working. By this invention, these cords are eliminated and the operative can position the light immediately in the desired position.

The devices for effecting this result are simple in form, not liable to get out of order and inexpensive to manufacture.

What I claim as my invention and desire to secure by Letters Patent is:

1. A light holder comprising a horizontally arranged guide, a horizontally arranged ring suspended from said guide and adjustable along the said guide, and a cable clamp having means for detachably engaging said ring at various points on the periphery of the latter.

2. A light holder comprising a rod having a hook at the upper end thereof, a ring at the lower end of the rod arranged in a plane at a right angle to the rod, and a cable clamp having a hook for detachably engaging said ring at various points on the periphery of the latter.

3. A light holder comprising a suspension rod, a ring, supporting arms for the ring having their ends turned laterally in the same direction, a head formed by a U-shaped piece, two arms of which are provided with alined openings, some of which have the laterally turned ends of the supporting arms secured therein and the other of which have the suspension rod extending therethrough, and a clamping member supported by the connecting portion between the arms and engaging the suspension rod.

4. A light holder comprising a horizontally arranged rod having laterally extending supports at its ends, a suspension rod having a hook engaging said horizontally arranged rod to move longitudinally of said rod, a head clamped to said suspension rod, supporting arms extending from said head, a ring supported by said supporting arms, and a cable clamp having a hook engaging said ring.

CHARLES ENGLERT.

Copies of this patent may be obtained for five cents each, by addressing the "Commissioner of Patents, Washington, D. C."